US008889992B2

(12) United States Patent
Han et al.

(10) Patent No.: US 8,889,992 B2
(45) Date of Patent: Nov. 18, 2014

(54) STRIPPABLE INSULATION SHIELD FOR CABLES

(75) Inventors: Suh Joon Han, Belle Mead, NJ (US); Raymond L. Laakso, Jr., St. Francisville, LA (US)

(73) Assignee: Dow Global Technologies LLC, Midland, MI (US)

( * ) Notice: Subject to any disclaimer, the term of this patent is extended or adjusted under 35 U.S.C. 154(b) by 172 days.

(21) Appl. No.: 13/698,862

(22) PCT Filed: May 11, 2011

(86) PCT No.: PCT/US2011/036050
§ 371 (c)(1),
(2), (4) Date: Nov. 19, 2012

(87) PCT Pub. No.: WO2011/152969
PCT Pub. Date: Dec. 8, 2011

(65) Prior Publication Data
US 2013/0062096 A1   Mar. 14, 2013

Related U.S. Application Data

(60) Provisional application No. 61/351,003, filed on Jun. 3, 2010.

(51) Int. Cl.
*H01B 1/24* (2006.01)
*H01B 3/00* (2006.01)
*H01B 3/44* (2006.01)
*C08L 23/28* (2006.01)
*C08L 23/08* (2006.01)

(52) U.S. Cl.
CPC .............. *C08L 23/286* (2013.01); *H01B 3/002* (2013.01); *H01B 3/441* (2013.01); *H01B 3/448* (2013.01); *C08L 23/0853* (2013.01)
USPC .................................................. 174/120 SC

(58) Field of Classification Search
USPC .................................................. 174/120 SC
See application file for complete search history.

(56) References Cited

U.S. PATENT DOCUMENTS

| 2,586,363 | A |   | 2/1952 | McAlevy |
| 3,296,222 | A |   | 1/1967 | Dixon et al. |
| 3,299,014 | A |   | 1/1967 | Kalil |
| 3,454,544 | A |   | 7/1969 | Young et al. |
| 3,735,025 | A | * | 5/1973 | Ling et al. ............... 174/120 SC |
| 3,909,507 | A |   | 9/1975 | Betts et al. |
| 4,144,202 | A |   | 3/1979 | Ashcraft et al. |
| 4,255,303 | A | * | 3/1981 | Keogh ........................ 523/200 |
| 4,286,023 | A |   | 8/1981 | Ongchin |
| 4,493,787 | A |   | 1/1985 | Taniguchi et al. |
| 4,591,621 | A |   | 5/1986 | Ennis |
| 4,767,823 | A |   | 8/1988 | Jones et al. |
| 5,242,987 | A |   | 9/1993 | Brugel |
| 5,246,783 | A |   | 9/1993 | Spenadel et al. |
| 5,272,236 | A |   | 12/1993 | Lai et al. |
| 5,278,272 | A |   | 1/1994 | Lai et al. |
| 6,496,629 | B2 |   | 12/2002 | Ma et al. |
| 6,514,608 | B1 |   | 2/2003 | Foulger |
| 6,714,707 | B2 |   | 3/2004 | Rossi et al. |
| 6,858,296 | B1 | * | 2/2005 | Mendelsohn et al. ........ 428/383 |
| 6,875,820 | B2 |   | 4/2005 | Berard et al. |
| 2002/0032258 | A1 |   | 3/2002 | Tsukada et al. |

FOREIGN PATENT DOCUMENTS

| JP | 56057109 | 6/1981 |
| JP | 3029210 | 2/1991 |
| WO | 2005031761 | 4/2005 |

OTHER PUBLICATIONS

International Search Report for PCT Application No. PCT/US2011/036050 mailed on Jul. 9, 2011.

* cited by examiner

*Primary Examiner* — Jenny L Wagner
*Assistant Examiner* — Michael P McFadden
(74) *Attorney, Agent, or Firm* — Whyte Hirschboeck Dudek S.C.

(57) ABSTRACT

Strippable semiconductive shields comprise a composition comprising in weight percent (wt %) based on the weight of the composition: (A) 20 to 80% of an interpolymer of an olefin and an $\alpha,\beta$-unsaturated carbonyl comonomer, (B) 1 to 90% chlorinated polyolefin, (C) 20 to 45% carbon black, (D) 0.1 to 5% antioxidant, (E) 0.01 to 5% acid scavenger stabilizer; (F) Optionally free radical initiator, (G) Optionally silane functionality, (H) Optionally a sulfur-containing curative, and (I) Optionally a radiation-cure catalyst.

7 Claims, No Drawings

STRIPPABLE INSULATION SHIELD FOR CABLES

CROSS REFERENCE TO RELATED APPLICATION

The present application is the national phase of PCT Patent Application No. PCT/US2011/036050 filed May 11, 2011, which claims the benefit of U.S. Ser. No. 61/351,003, filed Jun. 3, 2010. The entire content of which is incorporated by reference herein.

BACKGROUND OF THE INVENTION

1. Field of the Invention

This invention relates to wire and cable. In one aspect the invention relates to power cables that comprise a core element surrounded by a semiconductive shield which in turn is surrounded by an insulation layer which in turn is surrounded by a semiconductive insulation shield layer while in another aspect, the invention relates to power cables in which at least one of the semiconductive shields is strippable from the insulation layer. In yet another aspect the invention relates to a strippable semiconductive shield comprising a chlorinated polyolefin.

2. Description of the Related Art

The construction of insulated, electrical conductors, i.e. wires and cables, designed for all forms of voltage applications but especially for medium to high voltage applications, is well known in the art and commonly comprises a core conductor of one or more strands of a conducting metal or alloy such as copper or aluminum, a layer of semi-conductive shielding, a layer of insulation, such as crosslinked polyethylene, and a layer of semi-conductive insulation shielding, overlying the insulation. A plurality of neutral wires which are usually made of copper may be embedded in or wrapped around the layer of semi-conductive insulation shielding, if desired, in the form of a concentric ring around the insulated cable.

The formation of crosslinking bonds between the insulation and shielding makes subsequent separation of the two layers (insulation and semi-conductive shielding) such as occurs in making splices or terminal connections, very difficult and time consuming. Such a strong bond also makes the semi-conductive layer prone to leave carbon residues on the insulation even when it is finally peeled off. Accordingly, a strippable semi-conductive shielding which can be easily and cleanly stripped from the insulation of an insulated conductor is desirable in this art.

U.S. Pat. No. 4,286,023 teaches that nitrile rubber. e.g., butadiene-acrylonitrile rubber (NBR) is a key component in certain commercial strippable insulation shields as a strip control agent. However, the NBR can be a source of issues such as agglomeration in the rubber handling system in the semiconductive shield production unit, product quality variation from supplier, and property deterioration upon heat aging.

U.S. Published Patent Application 2002/032258 teaches the incorporation of silicon rubber and polypropylene with ethylene-alkyl acrylate copolymer for strippable force control within the polyolefin substrate.

U.S. Pat. No. 6,514,608 teaches a semiconductive jacket material for jacketing a cable, the semiconductive jacket material comprising: (A) a minor phase material comprising a semicrystalline polymer and a conductive filler material dispersed in said minor phase material in an amount sufficient to be equal to or greater than an amount required to generate a continuous conductive network in said minor phase material; and (B) a major phase material, the major phase material comprising a polymer which when mixed with the minor phase material will not engage in electrostatic interactions that promote miscibility. The minor phase material is dispersed within the major phase material. Suitable minor phase materials include any semicrystalline polymer such as high density polyethylene (HDPE), polypropylene, poly-1-butene, poly(styrene) (PS), polycarbonate, poly(ethylene terephthalate), nylon 66, nylon 6 and mixtures of two or more of these polymers. Suitable materials for the major phase material include, for example, ethylene vinyl acetate (EVA), polybutylene terephthalate, PS, poly(methyl methacrylate) (PMMA), polyethylene, polypropylene, polyisobutylene, poly(vinyl chloride), poly(vinylidene chloride), poly(tetrafluoroethylene), poly(vinyl acetate), poly(methyl acrylate), polyacrylonitrile, polybutadiene, poly(ethylene terephthalate), poly(8-aminocaprylic acid), poly(hexamethylene adipamide) and mixtures of two or more of these polymers.

SUMMARY OF THE INVENTION

Chlorinated polyethylene (CPE) is an effective strip control additive in strippable semiconductive shield for wire and cable, cable accessories and joint and termination applications. The effect of polar comonomers such as vinyl chloride or acrylonitrile on the solubility parameter of ethylene copolymers can be estimated by the mixing rule and from the group contribution method of cohesive energy density (Van Krevelen, "Properties of Polymers"). According to the estimation, CPE with 20 to 100 mole percent of chlorine content provides a similar solubility parameter range as that of acrylonitrile copolymer containing 10 to 40 mole percent of acrylonitrile. As such, the polarity of acrylonitrile copolymer is matched by the polarity of CPE. Chlorinated polyethylene is also easily handled in manufacturing operations as an additive because it can also be prepared in the shape of powdery granules. It can be formulated with conventional organic peroxide cure system and also with moisture curable system.

In one embodiment the invention is a composition for the manufacture of strippable semiconductive shields for use in extruded coatings on electrical power transmission and distribution cables and also in molded coatings for cable accessories, joints and terminations. The semiconductive shield composition comprises in weight percent (wt %) based on the weight of the composition:

(A) 20 to 80% of a interpolymer of an olefin and an $\alpha,\beta$-unsaturated carbonyl comonomer,
(B) 1 to 90% chlorinated polyolefin,
(C) 20 to 45% carbon black,
(D) 0.1 to 5% antioxidant,
(E) 0.01 to 5% acid scavenging stabilizer;
(F) Optionally free radical initiator, e.g., organic peroxide,
(G) Optionally silane functionality, e.g., a vinyl alkoxy silane or an ethylene/vinyl alkoxy silane copolymer,
(H) Optionally a sulfur-containing curative, e.g., a blend of esters of 2,5-dimercapto-1,3,4-thiadiazole, and
(I) Optionally a radiation-cure catalyst.

In one embodiment, this invention utilizes the incorporation of (1) highly chlorinated polyolefin, e.g., highly chlorinated polyethylene (CPE), and (2) ethylene-vinyl acetate copolymer in a strippable semiconductive shield, which promotes thermodynamic immiscibility with a nonpolar polyolefin substrate. Polymer immiscibility and decreased interfacial crosslinking between the insulation shield and polyolefin insulation substrate are key factors for decreasing adhesion between two layers in electric cable system.

In one embodiment the strippable semiconductive shield composition is crosslinked through the action of a free radical initiator, e.g., organic peroxide, generally promoted with heat. In one embodiment the strippable semiconductive shield composition is crosslinked through the action of silane functionality, e.g., a vinyl alkoxy silane or an ethylene/vinyl alkoxy silane copolymer, generally promoted with moisture. In one embodiment the strippable semiconductive shield composition is crosslinked (vulcanized) through the action of a sulfur-containing curative, e.g., a blend of esters of 2,5-dimercapto-1,3,4-thiadiazole, generally promoted with heat. In one embodiment the strippable semiconductive shield composition is crosslinked through the action of radiation, e.g., UV, IR, gamma, etc, generally promoted with a radiation-cure catalyst, e.g., dibutyltindilaurate.

The strippable semiconductive shield compositions of this invention exhibit a strip force of greater than (>) 3 pounds (1.4 kg) per half inch (1.3 cm) at 23° C. and the strip force of less than (<) 24 pounds (10.9 kg) per half inch (1.3 cm) at 23° C.

In one embodiment the invention is a wire or cable comprising a strippable semiconductive shield comprising the composition as described above.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of components in the semiconductive shield composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer blend", "blend" and like terms mean a mixture of two or more polymers. Such a mixture may or may not be miscible. Such a mixture may or may not be phase separated. Such a mixture may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to water).

(A) Interpolymer of an Olefin and α,β-Unsaturated Carbonyl Comonomer

Representative of the interpolymers of an, olefin and an alpha,beta-unsaturated carbonyl comonomer are copolymers comprising units derived from ethylene and acrylic acid or methacrylic acid (EAA or EMAA) or their ionomers (e.g. their metal salts) or esters (e.g., ethylene methyl acrylate and ethylene methacrylate), or acrylic acid esters (e.g., ethylene and ethyl acrylate, ethylene and butyl acrylate, ethylene and methyl acrylate), ethylene and vinyl acetate (EVA) and its derivative ethylene vinyl alcohol (EVOH), ethylene and carbon monoxide (ECO), ethylene/propylene and carbon monoxide (EPCO), ethylene/carbon monoxide/acrylic acid terpolymer (ECOAA), and the like. With respect to EAA and EMAA (and their derivatives), these materials are usually produced by the free radical copolymerization of ethylene with acrylic acid or methacrylic acid. The resulting interpolymers have carboxylic acid groups along the backbone and/or side chains of the interpolymers which can be subsequently neutralized or partially neutralized with a base or esterified with an alcohol. Typically these interpolymers contain between 10 and 70, more typically between 20 and 60, and even more typically between 30 and 45 percent by weight of acrylic acid or methacrylic acid monomer units in the polymer chain. The melt index of these interpolymers is typically in the range of 0.5 to 1500, more typically in the range of 5 to 300 g/10 min, as determined by ASTM D-1238 Procedure A, Conditions E and N, at a temperature of 190° C.

One preferred interpolymer of ethylene and an alpha,beta-unsaturated carbonyl comonomer is ethylene vinyl acetate, a well known polymer that is readily available commercially, e.g., ELVAX® EVA resins available from DuPont. The vinyl acetate content of the EVA resins used in the practice of this invention can range widely, but typically the minimum vinyl acetate content is at least 10, more typically at least 20 and even more typically at least 25, wt %. The maximum vinyl acetate content of the EVA resins used in the practice of this invention can also range widely, but typically it is not greater than 70, more typically not greater than 50 and even more typically not greater than 45, w %.

The interpolymer of an olefin and an O-unsaturated carbonyl comonomer typically comprises at least 20, more typically at least 30 and even more typically at least 40, wt % of the semiconductive shield composition. The interpolymer of ethylene and an α,β-unsaturated carbonyl comonomer typically comprises not more than 80, more typically not more than 70 and even more typically not more than 60, wt % of the semiconductive shield composition.

(B) Chlorinated Polyolefin

The chlorinated olefin polymer component of the semiconductive shield compositions of the invention is at least one of (1) chlorinated polyethylene homopolymer prepared from polyethylene having an $I_{10}$ melt index value of from 0.05 to 110 g/10 min, and (2) chlorinated copolymers prepared from polyolefins having an $I_{10}$ melt index value of from 0.05 to 110 g/10 min that contain copolymerized units of (a) ethylene, and (b) up to 10 mole percent of a copolymerizable monomer. The chlorinated olefin polymer may optionally contain chlorosulfonyl groups. That is, the polymer chain can have pendant-chlorine groups and chlorosulfonyl groups. Such polymers are known as chlorosulfonated olefin polymers.

Representative chlorinated and chlorosulfonated olefin polymers include (1) chlorinated and chlorosulfonated homopolymers of ethylene and (2) chlorinated and chlorosulfonated copolymers of ethylene and at least one ethylenically unsaturated monomer selected from the group consisting of $C_3$-$C_{10}$ alpha mono-olefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$, carboxylic acids. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be di- or copolymers, terpolymers, or higher order copolymers. Preferred chlorinated olefin polymers are-chlorinated polyethylene and chlorinated copolymers of ethylene vinyl acetate.

The chlorinated olefin polymers of the present invention can be prepared from polyolefin base resins of most molecular weights. Typically the polyolefin base resins are characterized by having $I_{10}$ melt index values of from 0.05 to 110 g/10 min. $I_{10}$ melt indices within the broad range of 0.05 to 110 g/10 min correspond generally to weight average molecular weights of 2,000-1,000,000 Daltons. Olefin polymers having $I_{10}$ melt indices below 0.05 are difficult to manufacture.

The chlorinated and chlorosulfonated olefin polymers useful in the practice of this invention typically contain 20-80, more typically 25-70 and even more typically 30-60 mole percent chlorine. The melt index of the non-chlorinated polyolefin base resins is from 0.05 to 110 g/10 min. If the chlorinated olefin polymer is chlorosulfonated, it will generally have a sulfur content of up to 6 wt %, more typically of 1-3 wt %.

The chlorinated olefin polymers and chlorosulfonated olefin polymers suitable for use in the semiconductive shield compositions of this invention can be prepared from polyolefin resins that are branched or unbranched. The polyolefin base resins can be prepared by free radical processes, Ziegler-Natta catalysis, metallocene catalysis, or with constrained geometry catalyst systems as, for example, those disclosed in U.S. Pat. Nos. 5,272,236 and 5,278,272. Chlorination or chlorosulfonation of the base resins can take place in suspension, solution, solid state or fluidized bed. Free radical suspension chlorination processes are described and taught in U.S. Pat. Nos. 3,454,544, 4,767,823 and the references cited within each. Such processes involve preparation of an aqueous suspension of a finely divided ethylene polymer which is then chlorinated. An example of a free radical solution chlorination process is disclosed in U.S. Pat. No. 4,591,621. The polymers may also be chlorinated in the melt or within fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363; 3,296,222; 3,299,014 and 5,242,987.

For purposes of this invention, poly(vinyl chloride), i.e., a polymer prepared from the polymerization of vinyl chloride, is not a chlorinated polyolefin.

The chlorinated polyolefin typically comprises at least 1, more typically at least 5 and even more typically at least 10, wt % of the semiconductive shield composition. The interpolymer of ethylene and an α,β-unsaturated carbonyl comonomer typically comprises not more than 90, more typically not more than 80 and even more typically not more than 70, wt % of the semiconductive shield composition.

(C) Carbon Black

Virtually any carbon black can be used in the practice of this invention. Representative examples of carbon black include ASTM grade N50, N60, N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. Carbon black also includes furnace black, acetylene black, thermal black, lamb black and Ketjen black. These carbon blacks have iodine absorptions ranging from 10 to 200 g/kg and DBP number ranging from 30 to 400 cc/100 g, nitrogen surface area ranging from 10 to 1,000 $cm^3$/100 g. Generally, smaller particle sized carbon blacks are employed to the extent cost considerations permit. In one embodiment the carbon black is N110-type carbon black to achieve good weathering performance in wire and cable jacketing. In one embodiment the carbon black is conductive furnace black. In one embodiment the conductive carbon can be selected from carbon fiber, carbon nanotubes, fullerene, graphites and expanded graphite platelets.

The carbon black typically comprises at least 10, more typically at least 20 and even more typically at least 30, wt % of the semiconductive shield composition. The carbon black typically comprises not more than 45, more typically not more than 40, wt % of the semiconductive shield composition.

Antioxidant

Any compound that will minimize the oxidation that can occur during the processing of the interpolymers of (A) and the chlorinated polyolefins of (B) can be used as the antioxidant in the compositions of this invention. Examples of antioxidants include, but are not limited to, hindered phenols such as tetrakis[methylene(3,5-di-tert-butyl-4-hydroxyhydro-cinnamate)]methane; bis[(beta-(3,5-ditert-butyl-4-hydroxybenzyl)-methyl-carboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydro-cinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; varioussiloxanes; polymerized 2,2,4-trimethyl-1,2-dihydro-quinoline, n,n'-bis(1,4-dimethyl-pentyl-p-phenylenediamine), alkylated diphenylamines, 4,4'-bis(alpha,alpha-dimethyl-benzyl)diphenylamine, diphenyl-p-phenylenediamine, mixed di-aryl-p-phenylenediamines, and other hindered amine anti-degradants or stabilizers.

The antioxidant typically comprises at least 0.1, more typically at least 0.5 wt % of the semiconductive shield composition. The antioxidant typically comprises not more than 5, more typically not more than 4 and even more typically not more than 3, wt % of the semiconductive shield composition.

Acid Scavenger Stabilizer

The acid scavenger is added to neutralize hydrochloric acid (HCl) that maybe liberated from the chlorinated polyethylene during processing or curing stages. In addition they can provide a measure of stability for high-temperature end-use applications. Typical acid scavengers include magnesium oxide, magnesium stearate, magnesium hydroxide and epoxidized soy bean oil. The acid scavenger is used in known ways and in known amounts, e.g., 0.01 to 5 wt % based on the weight of the composition.

Optional Crosslinking Components

In one embodiment the semiconductive shield compositions of this invention are crosslinked, either fully or partially. In those embodiments in which the semiconductive shield composition is to be crosslinked, it typically contains at least one crosslinking agent and/or promoter to facilitate the crosslinking of the composition. These optional components include, but are not limited to, (1) a free radical initiator, e.g., an organic peroxide or an azo compound, (2) silane functionality, e.g., vinyl alkoxy silane or silane functional polyolefin with vinyl alkoxy silane typically activated with moisture, (3) a sulfur-containing curative to facilitate vulcanization, and (4) a radiation-curing agent to promote crosslinking of the composition with electromagnetic radiation, e.g., infrared (IR), ultraviolet (UV), visible, gamma ray, etc. These optional crosslinking agents and promoters are used in known ways and in known amounts.

Free Radical Initiator

Suitable free radical initiators used as crosslinking agents are the dialkyl peroxides and diperoxyketal initiators. These compounds are described in the *Encyclopedia of Chemical Technology*, 3$^{rd}$ edition, Vol. 17, pp 27-90 (1982). Mixtures of two or more free radical initiators may also be used together as the free radical initiator. In addition, free radicals can form from shear energy, heat or radiation.

In the group of dialkyl peroxides, nonlimiting examples of suitable free radical initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3,2,5-dimethyl-2,5-di(t-amylperoxy)hexyne-3, α,α-di[(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy) butanol and mixtures of two or more of these initiators.

In the group of diperoxyketal initiators, nonlimiting examples of suitable free radical initiators include: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

The amount of free radical initiator present in the composition can vary with the minimum amount being sufficient to afford the desired range of crosslinking. The minimum amount of free radical initiator is at least about 0.02 wt %, or at least about 0.05 wt %, or at least about 0.1, wt % based upon the weight of the crosslinkable polymer(s). The maximum amount of free radical initiator in the composition can vary, and it is typically determined by such factors as cost, efficiency and degree of desired crosslinking. The maximum amount may be less than about 20 wt %, or less than about 15 wt %, or less than about 10, wt % based upon the weight of the crosslinkable polymer(s).

Silane Functionality

The silane functionality can be included in the semiconductive shield composition as a graft to one or more of the other components of the composition (e.g., grafted to the interpolymer of (A)), or as a separate component, e.g., as a separate polyolefin polymer (e.g., polyethylene) either grafted with the silane functionality or in which the silane functionality is copolymerized directly into the polymer backbone (e.g., SILINK® ethylene-silane copolymer available from The Dow Chemical Company).

Any silane that will effectively copolymerize with an olefin, e.g., ethylene, or graft to and crosslink an olefin polymer can be used as the silane functionality in the practice of this invention, and those described by the following formula are exemplary:

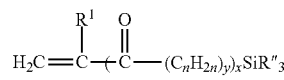

in which $R^1$ is a hydrogen atom or methyl group; x and y are 0 or 1 with the proviso that when x is 1, y is 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl. Such silanes may be copolymerized with ethylene in a reactor, such as a high pressure process. Such silanes may also be grafted to a suitable ethylene polymer by the use of a suitable quantity of organic peroxide, either before or during a shaping or molding operation. Additional ingredients such as heat and light stabilizers, pigments, etc., also may be included in the formulation. In any case, the crosslinking reaction typically takes place following the shaping or molding step by moisture-induced reaction between the grafted or copolymerized silane groups, the water permeating into the bulk polymer from the atmosphere or from a water bath or "sauna". The phase of the process during which the crosslinks are created is commonly referred to as the "cure phase" and the process itself is commonly referred to as "curing".

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this invention. If filler is present, then preferably the crosslinker includes vinyl trialkoxy silane.

The amount of silane crosslinker used in the practice of this invention can vary widely depending upon the nature of the polymer, the silane, the processing or reactor conditions, the grafting or copolymerization efficiency, the ultimate application, and similar factors, but typically at least 0.1, preferably at least 0.5, weight percent is used. Considerations of convenience and economy are two of the principal limitations on the maximum amount of silane crosslinker used in the practice of this invention, and typically the maximum amount of silane crosslinker does not exceed 5, preferably it does not exceed 3, weight percent.

Sulfur-Containing Curatives

In one embodiment the semiconductive shield compositions of this invention are vulcanized, i.e., crosslinked with sulfur bridges. Examples of suitable sulfur vulcanizing agents include sulfur donor vulcanizing agents. Preferably, the sulfur vulcanizing agent is a blend of esters of 2,5-dimercapto-1,3,4-thiadiazole. As known to those skilled in the art, the sulfur cure donor systems such as the 2,5-dimercapto-1,3,4-thiadiazole vulcanizing agents are used in an amount ranging from about 0.1 to 10, typically from 1 to 7 and more typically from 2 to 5, wt % based on the weight of the chlorinated polymer. The typical cure system also includes an accelerator, e.g., TBAB (tertiary butyl ammonium bromide) or other suitable accelerator, and an inorganic base such as high surface area MgO.

Radiation Curing Agents

Any compound that will generate a free radical upon the absorption of electromagnetic energy, e.g., from radio waves or below through microwaves, infrared, visible, UV, X-ray to gamma rays and beyond, can be used in the practice of this invention. These catalysts generally include organic bases, carboxylic acids, and organometallic compounds including, but not limited to, organic titanates and complexes or carboxylates of lead, cobalt, iron, nickel, zinc and tin. Dibutyltindilaurate, dioctyltinmaleate, dibutyl tin diacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective. The catalyst (or mixture of catalysts) is used in known amounts, e.g., between 0.015 and 0.035 parts per hundred resin, and in known ways.

Fillers and Other Additives

The semiconductive shield compositions can be filled or unfilled. If filled, then the amount of filler present should preferably not exceed an amount that would cause a large degradation of the electrical and/or mechanical properties of the composition. Typically, the amount of filler present is between 2 and 80, preferably between 5 and 70, weight percent (wt %) based on the weight of the polymer. Representative fillers include kaolin clay, magnesium hydroxide, silica, calcium carbonate. The filler may or may not have flame retardant properties. In a preferred embodiment of this invention in which filler is present, the filler is coated with a material that will prevent or retard any tendency that the filler might otherwise have to interfere with the function of the composition and/or the cure of the composition. Stearic acid is illustrative of such a filler coating.

The compositions of this invention can contain other additives such as, for example, UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), colorants or pigments to the extent that they do not interfere with desired physical or mechanical properties of the compositions of the present invention. These additives are used in known amounts and in known ways.

Compounding/Fabrication

Compounding of the semiconductive shield compositions of this invention can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, can affect properties of the composition such as viscosity, volume resistivity, and extruded surface smoothness.

The compounding temperature for the compositions of this invention for a one-step process to include curatives is typically from the melting point of the interpolymer, e.g., 100° C., to 140° C., more typically from 105 to 120° C. The various components of the final composition can be added to and compounded with one another in any order, or simultaneously, but typically the interpolymer is first compounded with chlorinated polyolefin and then that blend along with any remaining components of the composition and any additives are compounded with one another. In a two-step compounding process, the intermediate formulation can be compounded from 100 to 250° C. without curatives followed by a peroxide soaking or blending process.

In some embodiments the additives are added as a premixed masterbatch. Such masterbatches are commonly formed by dispersing the additives, either separately or together, into an inert plastic resin or major component of the composition, e.g., the interpolymer and/or chlorinated polyolefin. Masterbatches are conveniently formed by melt compounding methods.

Articles of Manufacture

In one embodiment the polymer composition of this invention is applied as a semiconductive shield to a cable in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to but below the melting point of the composition until the article has reached the desired degree of crosslinking. Cure may begin in the reactor-extruder.

Other articles of manufacture that can be prepared from the polymer compositions of this invention, particularly under high pressure and/or elevated moisture conditions, include molded coatings for cable accessories and joints and terminations. These articles can be manufactured using known equipment and techniques.

The invention is described more fully through the following examples. Unless otherwise noted, all parts and percentages are by weight.

Specific Embodiments

The polymers used in the formulations of Examples 1-6 and the Comparative Example are reported in Table 1. The additives of these formulations are reported in Table 2.

TABLE 1

Polymer Properties

| Material | Name | Supplier | % Comonomer | MI | Density, g/cc | Key properties |
|---|---|---|---|---|---|---|
| EVA | ELVAX ® | DuPont | 33 wt % vinyl acetate | 30 | 0.957 | |
| CPE 1 | | Dow | 36% Cl | | | Heat of fusion: 0.17 cal/g |
| CPE 2 | | Dow | 40% Cl | | | Heat of fusion: 0.27 cal/g |
| CPE 3 | | Dow | 49% Cl | | | Heat of fusion: 0.3 cal/g |
| Acrylonitrile rubber | NIPOL ® | ZEON | 33 wt % acrylonitrile | Moony viscosity 50 | 0.98 | |
| HFDB-4202 | Water tree retardant crosslinkable polyethylene insulation | Dow | | 2 | 0.92 | |

The heat of fusion by Differential Scanning calorimetry is a measure of the residual crystallinity remaining in the CPE product.

TABLE 2

Additive Description

| Material | Name | Supplier | % Comonomer | Density, g/cc | Key properties |
|---|---|---|---|---|---|
| Carbon black | CSX | CABOT | Conductive furnace black | | Dibutyl phthalate adsorption value of 98 cm3/100 g, Iodine number of 43 mg/g |
| Magnesium stearate | Processing aid | | | Specific gravity = 1 | |
| Antioxidant | Naugard antioxidant | CHEMTURA | 4,4' bis(dimethyl benzyl) diphenyl amine | Specific gravity = 1.14 at 50 C. | |
| Processing additive | Kemamide bis amide | Crompton | Fatty acid bis amide | Density of 0.89 g/c 3 | |
| Organic peroxide | α,α'-bis(tert-butyl peroxy)-dis-isopropyl benzene mixture | Geo Specialty Chemical | | Specific gravity = 1.01 | |

The chlorinated elastomers are prepared in an aqueous slurry process from a polyethylene having a melt index ($I_{10}$ at 190° C.) of 0.6 dg/minute substantially according to the procedure described in U.S. Pat. No. 4,767,823 and the references cited within it. The intermediate shield formulations are prepared by melt mixing in a Brabender mixer at 140° C. at 30 revolutions per minute (rpm) for 10 minutes. After the intermediate formulations are prepared, the organic peroxide is added to the intermediate formulations at 110° C. at 30 rpm for 5 minutes, and then cooled to room temperature. The product is cut into small pieces to make plaques.

Single plaques are prepared from the insulation shield formulations reported in the Table 3 and insulation layer formulation of HFDB-4202 insulation pellets by compression molding. The temperature for compression molding of the shield plaque is 100° C. Approximately 65 grams of shield formulation are used to prepare 30 mil plaques. The temperature for compression molding of the insulation pellets is 130° C. Approximately 135 grams of insulation formulation are used to prepare a 125 mil plaque. The weighed material is sandwiched between two MYLAR® plastic sheets and is separated from the press platens by sheets of aluminum foil. The following typical pressures and time cycles are used for the compression molding: (1) 2000 psi (pounds per square inch) for 5 minutes; (2) 50,000 psi for 3 minutes; then (3) quench cooling pressure of 50,000 pounds for 10 minutes.

An adhesion plaque sandwich is made by curing two single plaques under pressure (one shield plaque and one insulation plaque). The MYLAR® sheets are removed from the single plaques and any excess is trimmed. The 125 mil trimmed insulation plaque is placed in a 75 mil mold. At least 2 inches on the top edge of the insulation plaque are covered with a strip of MYLAR® sheet to prevent adhesion to the shield plaque in a region that will form a "pull-tab." The 30 mil shield plaque is then placed on top of the insulation plaque. The sandwich is separated from the press platens by MYLAR® sheets, and placed in the press. The press is then closed and a pressure of 1000 psi is maintained for 4 minutes at 130° C. Then steam is introduced into the press at 190° C. (about 180 psig). A cure cycle of 20,000 psi for 25 minutes (including the time to heat up from 130° C. to 190° C.) is then effected followed by a quench cooling cycle of 20,000 psi for 15 minutes.

The sandwich is removed from the press, the MYLAR® sheets are removed, the excess is trimmed, and the sandwich is cut into five samples (each 1.5 inches wide by about 6 inches long). These samples are placed in a climate controlled room at 23° C. and 50 percent relative humidity overnight before any further testing.

A one-half inch strip is marked in the center of each sample. A razor is used to cut along each line so that the black material is cut all the way through to the insulation plaque. A stripping test is achieved with the use of a rotating wheel and an INSTRON® or similar tensile apparatus. Each sample is mounted to the wheel with the center strip mounted in the jaws of the tensile machine in such a manner that the tensile machine pulls the center strip from the sandwich plaque, while the wheel will rotate to maintain the perpendicular configuration of the surface of the plaque to the direction of tensile force. The jaws of the tensile machine travel at a linear speed of 20 inches per minute during the test, and are stopped when about one-half inch of unpeeled material remains. The Maximum Load and Minimum Load are reported from the test, while disregarding the first and last inch stripped. The plaque strip force is equal to the Maximum Load.

TABLE 3

Plaque Formulations

| | Ex. 1 | Ex. 2 | Ex. 3 | Ex. 4 | Ex. 5 | Ex. 6 | Comp. Ex. |
|---|---|---|---|---|---|---|---|
| EVA polymer | 50.2 | 41.2 | 50.2 | 41.2 | 50.2 | 41.2 | 51.2 |
| Carbon black | 36 | 36 | 36 | 36 | 36 | 36 | 36 |
| CPE 1 (36 wt % Cl) | 10 | 20 | 0 | 0 | 0 | 0 | 0 |
| CPE 2 (43 wt % Cl) | 0 | 0 | 10 | 20 | 0 | 0 | 0 |
| CPE3 (49 wt % Cl) | 0 | 0 | 0 | 0 | 10 | 20 | 0 |
| Processing additive | 2 | 2 | 2 | 2 | 2 | 2 | 2 |
| Antioxidant | 0.8 | 0.8 | 0.8 | 0.8 | 0.8 | 0.8 | 0.8 |
| Acrylonitrile rubber | 0 | 0 | 0 | 0 | 0 | 0 | 10 |
| Magnecium stearate | 1 | 1 | 1 | 1 | 1 | 1 | 1 |
| Total Intermediate | 100 | 100 | 100 | 100 | 100 | 100 | 100 |
| Intermediate | 99.3 | 99.3 | 99.3 | 99.3 | 99.3 | 99.3 | 99.3 |
| Organic peroxide | 0.7 | 0.7 | 0.7 | 0.7 | 0.7 | 0.7 | 0.7 |
| Strip test with Insulation compound, (HFDB-4202), lb- 0.5 inch | 13.6 | 10.4 | 14.7 | 9.9 | 11.7 | 10.2 | 13.0 |

As the CPE content increases in the semiconductive formulation, the strip force decreases effectively. The Association of Edison Illuminating Companies specifies that the insulation shields stripping tension should be greater than 6 pounds and less than 24 pounds for the shielded power cables at room temperature.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A wire or cable comprising an insulation layer in contact with a semiconductive insulation shield layer, the semiconductive shield layer comprising a composition comprising in weight percent (wt %) based on the weight of the composition:
   (A) 20 to 80% of an interpolymer of an olefin and an α,β-unsaturated carbonyl comonomer, wherein the interpolymer comprises units derived from ethylene and 10-50 wt % of vinyl acetate,
   (B) 1 to 90% chlorinated polyolefin, wherein the chlorinated polyolefin is a chlorinated polyethylene homopolymer,
   (C) 20 to 45% carbon black,
   (D) 0.1 to 5% antioxidant,
   (E) 0.01 to 5% acid scavenger stabilizer;
   (F) Optionally free radical initiator,
   (G) Optionally silane functionality,
   (H) Optionally a sulfur-containing curative, and
   (I) Optionally a radiation-cure catalyst,
   having a strip force between the insulation layer and the semiconductive insulation shield layer of greater than (>) 3 pounds (1.4 kg) per half inch (1.3 cm) at 23° C. and the wire or cable less than (<) 24 pounds (10.9 kg) per half inch (1.3 cm) at 23° C.

2. The wire or cable of claim 1 in which the chlorinated polyolefin is chlorinated polyethylene homopolymer having a melt index ($I_{10}$ at 190° C.) of 0.6 dg/minute with a non-chlorinated polyethylene base having a weight average molecular weight of 2,000 to 1,000,000 Daltons and comprising between 20 and 80 weight percent chlorine.

3. The wire or cable of claim 1 in which the carbon black is conductive furnace black.

4. The wire or cable of claim 2 in which the free radical initiator is present and it is an organic peroxide.

5. The wire or cable of claim 2 in which the silane functionality is present and it is copolymerized with and olefin or grafted to an olefin polymer.

6. The wire or cable of claim 2 in which the sulfur-containing curative is present and is a blend of esters of 2,5-dimercapto-1,3,4-thiadiazole.

7. The wire or cable of claim 2 further comprising a radiation curing agent.

* * * * *